(12) United States Patent
An et al.

(10) Patent No.: US 7,788,186 B1
(45) Date of Patent: Aug. 31, 2010

(54) METHOD AND SYSTEM FOR AUTOMATED PROPERTY VALUATION ADJUSTMENT

(75) Inventors: Mark Y. An, North Potomac, MD (US); Linghua Peng, Reston, VA (US); Hong Gao, Columbia, MD (US); Eric L. Rosenblatt, Derwood, MD (US)

(73) Assignee: Fannie Mae, Washington, DC (US)

( * ) Notice: Subject to any disclaimer, the term of this patent is extended or adjusted under 35 U.S.C. 154(b) by 1161 days.

(21) Appl. No.: 11/077,547

(22) Filed: Mar. 9, 2005

Related U.S. Application Data (60) Provisional application No. 60/551,947, filed on Mar. 10, 2004.

(51) Int. Cl.
G06Q 10/00 (2006.01)
G06Q 99/00 (2006.01)

(52) U.S. Cl. .................................... 705/306; 705/316
(58) Field of Classification Search ................ 705/1
See application file for complete search history.

(56) References Cited

U.S. PATENT DOCUMENTS

| | | | |
|---|---|---|---|
| 4,637,614 A | 1/1987 | Gibbon et al. | |
| 5,361,201 A | 11/1994 | Jost et al. | |
| 5,644,726 A | 7/1997 | Oppenheimer | |
| 5,870,720 A | 2/1999 | Chusid et al. | |
| 5,983,206 A | 11/1999 | Oppenheimer | |
| 6,345,262 B1 | 2/2002 | Madden | |
| 6,401,070 B1* | 6/2002 | McManus et al. | 705/1 |
| 6,438,526 B1 | 8/2002 | Dykes et al. | |
| 6,609,109 B1* | 8/2003 | Bradley et al. | 705/35 |
| 6,609,118 B1* | 8/2003 | Khedkar et al. | 705/36 R |
| 6,842,738 B1 | 1/2005 | Bradley et al. | |
| 6,871,140 B1 | 3/2005 | Florance et al. | |
| 6,904,414 B2 | 6/2005 | Madden | |
| 6,988,082 B1 | 1/2006 | Williams et al. | |
| 7,130,810 B2 | 10/2006 | Foster et al. | |
| 7,289,965 B1 | 10/2007 | Bradley et al. | |
| 7,340,431 B1 | 3/2008 | McManus et al. | |
| 2001/0029482 A1 | 10/2001 | Tealdi et al. | |
| 2001/0047327 A1 | 11/2001 | Courtney | |
| 2002/0059137 A1 | 5/2002 | Freeman et al. | |
| 2002/0099650 A1 | 7/2002 | Cole | |
| 2003/0036994 A1 | 2/2003 | Witzig et al. | |
| 2003/0046099 A1 | 3/2003 | Lamont et al. | |
| 2003/0065614 A1 | 4/2003 | Sweeney | |

(Continued)

OTHER PUBLICATIONS

Kelvie et al., "Technology in the Mortgage Industry: The Fannie Mae Experience", IP Pro, May/Jun. 2002, pp. 27-32.

(Continued)

*Primary Examiner*—John G Weiss
*Assistant Examiner*—Matthew Sittner
(74) *Attorney, Agent, or Firm*—Foley & Lardner LLP (57) ABSTRACT

A method and system are provided removing systematic bias from property value predictions obtained using automated property valuation models. The systematic bias is removed by deriving monthly adjustment factors that are location-specific. The monthly adjustment factors are obtained by comparing newly obtained purchase transaction data to model-generated valuations of properties in a base valuation database. The newly obtained purchase transactions may be obtained from newly obtained data on recently completed purchase transactions and loan application data on future purchase transactions. The monthly adjustment factors are applied to the property valuations in the base valuation database to obtain adjusted property values having reduced bias and thus improved accuracy.

28 Claims, 9 Drawing Sheets

U.S. PATENT DOCUMENTS

| | | |
|---|---|---|
| 2003/0093366 A1 | 5/2003 | Halper et al. |
| 2003/0149656 A1 | 8/2003 | Magruder et al. |
| 2003/0149658 A1 | 8/2003 | Rossbach et al. |
| 2003/0233324 A1 | 12/2003 | Hammour et al. |
| 2004/0019517 A1 | 1/2004 | Sennott |
| 2004/0059653 A1 | 3/2004 | Verkuylen et al. |
| 2005/0033618 A1 | 2/2005 | Rexius |
| 2005/0044050 A1 | 2/2005 | Hendrickson et al. |
| 2006/0074793 A1 | 4/2006 | Hibbert et al. |
| 2006/0106695 A1 | 5/2006 | Carlson et al. |
| 2006/0282356 A1 | 12/2006 | Andres et al. |
| 2007/0299753 A1 | 12/2007 | Averbuch et al. |
| 2008/0027845 A1 | 1/2008 | Dreyer et al. |

OTHER PUBLICATIONS

Final Office Action for U.S. Appl. No. 11/207,162, mailed May 13, 2009, 26 pages.

HUD Requirements for Appraisal/Valuation Process, referenced by Examiner in Final Office Action for U.S. Appl. No. 11/207/162 at p. 8, dated May 13, 2009, 19 pages.

HUD Mortgage Letter, dated May 20, 1997, 9 pages.

HUD, Prohibition of Property Flipping, dated May 22, 2003, 4 pages.

Non-Final Office Action for U.S. Appl. No. 11/207,162, mailed Dec. 9, 2008, 28 pages.

Office Action for U.S. Appl. No. 11/207,162, mailed Sep. 11, 2008, 9 pages.

Non-Final Office Action for U.S. Appl. No. 11/207,162, mailed Dec. 27, 2007, 8 pages.

Mark A. Beardsell, "Understanding Inflated Real Estate Appraisals and Detection Using Freddie Mac's Home Value Calibrator$^{SM}$", dated Aug. 12, 2003, 9 pages.

Doug Gordon, Accurate AVM Values Help Monitor Appraisal Risk, LSI Emerging Trends Summit, dated May 25, 2004, 15 pages.

Fannie Mae, Guide to Underwriting with Desktop Underwriter, Sep. 2002, 212 pages.

Fannie Mae, Guide to Underwriting with Desktop Underwriter, Version 4.0, Oct. 1997, 152 pages.

Williams, Comment: Technology and Other Keys to the Boom in Refinancing, American Banker, Apr. 2, 2003, 3 pages.

* cited by examiner

METHOD AND SYSTEM FOR AUTOMATED
PROPERTY VALUATION ADJUSTMENT

CROSS-REFERENCE TO RELATED PATENT
APPLICATIONS

The present Application claims the benefit of and priority as available under 37 U.S.C. §§119-21 to the following U.S. Patent Application (which is incorporated by reference in the present Application): U.S. Provisional Patent Application 60/551,947, titled "METHOD AND SYSTEM FOR AUTOMATED PROPERTY VALUATION ADJUSTMENT" filed Mar. 10, 2004.

BACKGROUND OF THE INVENTION

1. Field of the Invention

The present invention relates generally to property valuation and, more particularly, to automated property valuation. The present invention further relates to systems and methods for removing systematic bias from property valuation models.

2. Description of Related Art

Property valuation involves estimating the current fair market dollar value of a property. Changes in market conditions affect the value of properties. As a result, a property's value must be updated on a regular basis to reflect changes in market conditions, such as recent real estate transactions, trends toward larger houses, changes in interest rates, and so on.

The availability of accurate and up-to-date fair market property values is essential to banks, appraisers, investors in the secondary mortgage market, and other financial entities that deal with properties. For example, predictions of property values may be used to judge the values of residential properties that lenders submit to underwriters, to issue warnings on excessive valuations, and to allow abbreviated or no appraisal recommendations in other cases, often for a fee. For loan acquisitions, property values may be used to make guarantee fee adjustments. For post-purchase reviews, property values may be used to find collateral-related errors. Property value predictions may also be used for loss mitigation. Furthermore, predictions of property values are needed to assess the mark-to-market loan-to-value in a book of business.

Current appraisal processes for valuing large numbers of properties typically involve some type of model-based approach. For example, known model-based approaches in the mortgage include: repeated transactions (sales) index (RTI) models, tax assessment models, hedonic price models based on property characteristics, and neural network models based on property characteristics. These and other known automated property valuation models (APVMs) may be used individually to predict the values of properties. Alternatively, if more than one model prediction is available, it is also known to obtain a weighted average of those predictions. In either case, the data that support such valuation models may come from a variety of sources. Typical sources include loan acquisitions and public records data, which may be purchased from well-known data vendors. These data typically come in monthly cycles. As a result, property value databases are also typically updated every month.

Due to the important uses that are often made of property value predictions from APVMs, it is desirable that the predictions be as accurate as possible. Unfortunately, APVM predictions of mark-to-market values of residential properties are often subject to errors. For example, both idiosyncratic errors and systematic bias can affect the fair market value predictions of APVMs.

Idiosyncratic errors appear at the property level and typically result from inaccurate data. These errors tend to cancel out at a reasonable aggregate or cohort level. The main causes of idiosyncratic errors tend to be data quality and accuracy. There are at least three data related issues that may cause idiosyncratic errors. First, "true" property values are often measured with noise. Although a purchase transaction between parties of arm's length typically provides the best scenario for the true market value of the underlying property, other things can enter into a price negotiated in a sales contract. For example, the relative negotiating strength of the buyer and seller may be unequal. Moreover, the sale may reflect terms such as certain large value items that will be conveyed (e.g., furnishings), whether the seller will provide any help at the closing, rent-back arrangements, and the like.

A second data related issue that can lead to idiosyncratic errors is that each property has a unique quality or appeal. These unique property-specific characteristics may also change over time due to, for example, home improvements, neglect and abuse. To value a property, it is necessary to rely on other transacted properties in the corresponding geographical unit. The larger the unit, the more data are available for a stable index to be estimated. However, the larger the unit, the less representative the index is for the property level values.

A third type of data integrity issue that can lead to idiosyncratic errors involves property fraud, address mismatching, and other outliers.

Apart from the data integrity issues, which are property specific, systematic bias can also decrease the accuracy of model-based predictions of fair market value predictions. Systematic bias refers to either under-prediction or over-prediction that is sustained at the aggregate or cohort level. There are at least three possible causes of systematic bias in model-based value prediction: transformation bias, price tier effect, and time lag.

Transformation bias arises due to a mismatch between APVMs—which are typically specified in terms of logarithm of property value—and proportional prediction error (PPE). PPE is the common criterion used to evaluate APVMs. The impact of the transformation bias is model specific, but in general tends to be relatively small compared with the other two aforementioned sources of systematic bias.

Price tier effect refers to an empirical anomaly in which some APVMs tend to under-predict low-priced properties and over-predict high-priced properties (or vice versa), where the price tier is defined by the predicted property values.

Time lag refers to the inherent time delay in any APVM framework. This includes both processing cycle and intrinsic data delay. To illustrate these two sources, consider a typical prior art second quarter database update cycle depicted by a time line diagram 30 in FIG. 1 (PRIOR ART). The first source of time lag in this example is the value database processing cycle 32 from the data closing date (June 30) to the date that the value database is first used in business applications (August 23) at 34. In other words, about eight weeks are needed in this example just to push the model predictions through the processing cycle. The second source of time lag in this example is the data delay. Due to slow data arrivals, when the second quarter transaction data are initially uploaded in early July, only a portion of all the second quarter transactions is available. Moreover, the lack of data is proportionally greater for June data relative to April data. This non-equal representation is indicated by the triangular shape of the data gathering process 36.

Although home prices on average tend to rise over the long term, they do on occasion turn down in limited geographic areas. During periods of large up-swings in house prices, models with time lags will tend to under-predict house prices. By contrast, during periods of down-swing such models will tend to over-predict house prices. This can result in increased credit risk for lenders and cause other problems for businesses that rely on the accuracy of property value predictions.

In view of the foregoing, it would be desirable to provide an improved valuation adjustment scheme for use with APVMs that reduces bias. Such a scheme would facilitate more accurate predictions of current values of residential properties. Improved predictions of property values would, in turn, cause lenders to take value warnings more seriously, increase revenues from granting more appraisal waivers, reduce fraud in deals, raise repurchase and make-whole revenues, improve public reporting, and so on.

SUMMARY OF THE INVENTION

The present invention relates to systems and methods for providing property valuation predictions. The present invention further relates to systems and methods for removing bias from property valuation predictions.

In accordance with one aspect of an embodiment of the present invention, a method is provided for estimating property values. The method comprises obtaining a first estimate of a property from a first property valuation database, and adjusting the first estimate to reduce bias using purchase transaction data, thereby providing a second estimate having reduced bias.

In accordance with another aspect of an embodiment of the present invention, a method is provided for adjusting property value predictions to reduce bias. The method comprises deriving an adjustment factor for mitigating the bias using purchase transaction data, and applying the adjustment factor to a first property value prediction to provide a second property value prediction having reduced bias.

In accordance with a further aspect of an embodiment of the present invention, a system for adjusting property valuations for bias comprises a processor and memory operatively coupled to the processor. The memory contains program code for configuring the processor to apply an adjustment factor to a first property estimate to reduce bias, thereby providing a second property estimate having reduced bias.

In accordance with a different aspect of an embodiment of the present invention, a method is provided for estimating property values. The method comprises providing a first estimate of a property value utilizing a property valuation model, and adjusting the first estimate to reduce bias using purchase transaction data, thereby providing a second estimate having reduced bias.

In accordance with yet another aspect of an embodiment of the present invention, a system for estimating property values comprises a processor and memory operatively coupled to the processor. The memory contains program code for configuring the processor to provide a first property valuation using a property valuation model. The memory further contains an adjustment factor for reducing bias and program code for configuring the processor to apply the adjustment factor to the first property valuation to provide a second property valuation having reduced bias.

In accordance with still another aspect of an embodiment of the present invention, a system for estimating property values comprises means for obtaining a first estimate of a property. The system further comprises means for adjusting the first estimate to reduce bias using purchase transaction data, thereby providing a second estimate having reduced bias.

In accordance with another aspect of an embodiment of the present invention, a method comprises receiving a first estimate of a property from an automated property valuation model. The method further comprises adjusting the first estimate to reduce bias using purchase transaction data, thereby providing a second estimate having reduced bias.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENTS

Financial institutions such as banks, appraisers and investors in the secondary mortgage market often have need to create and maintain large databases of valuations for residential, real estate, investment or commercial properties that are updated on a regular basis, e.g., monthly or quarterly. Such property valuation databases may be used, for example, to provide model-based predictions of mark-to-market values for millions of residential properties in the U.S. Such property valuation databases are also frequently used in other business applications such as automated underwriting (AU) engines, loan acquisitions, and post-acquisition file reviews.

The models used in the creation of property valuation databases are often called Automated Property Valuation Models (APVMs). As explained above, the fair market values of properties provided by APVMs may suffer from at least two sources of inaccuracy: idiosyncratic errors and systematic bias. The former result from poor data integrity, show up at the property level, and tend to cancel out at a reasonable aggregate or cohort level. The latter often result from misspecification or misuse of APVMs, and tend to remain at the aggregate or cohort level.

A. Time Lag Adjustment

According to an exemplary embodiment explained in detail below, systematic bias in property value predictions provided by APVMs may be reduced by the use of transaction data. Transaction data may be data from loan applications (e.g., loan applications submitted to an AU engine), data from closed loans, and so on. As explained above, sources of systematic bias may include transformation bias, price tier effect and time lag. Of the three, time lag tends to be the most prominent.

Referring now to FIGS. 2-9, an adjustment for reducing time lag using loan application data will now be explained. As mentioned above, time lag refers to the gap between the point of time that the historical data represents and the point of time that is desired for a property value database to mark-to-market for use in business applications. The total time lag in a typical property value database comes from at least two sources: processing cycle and data delay.

Figure 2:
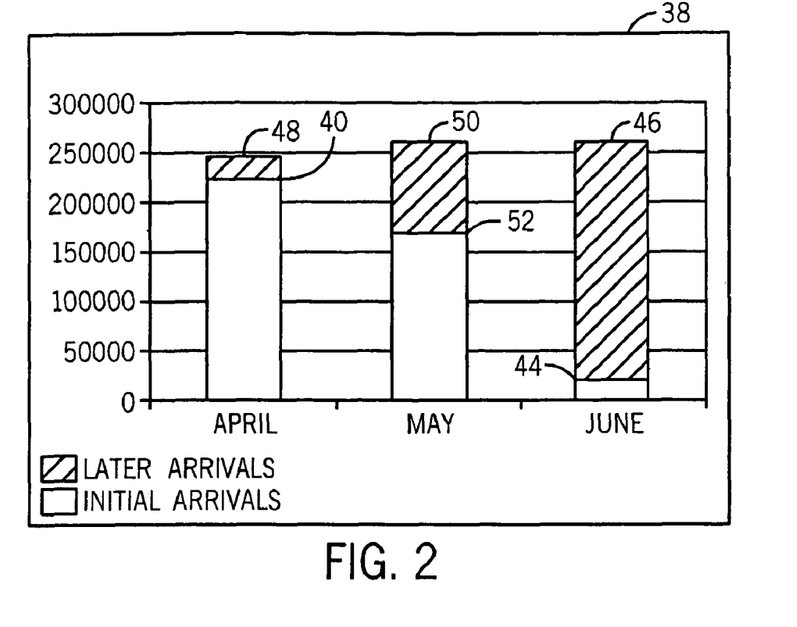
FIG. 2 is a bar chart showing second quarter (Q2) property transaction data counts at two different points in time.

FIG. 2 shows a chart 38 that illustrates the data delay inherent in transaction data that may be used in APVMs. Chart 38 does this by comparing the compositions of second quarter (Q2) transaction data by month at two different points in time: July 1 (immediately following the end of Q2), and approximately a year later (when substantially more new additions of Q2 transactions were available). Chart 38 illustrates the large discrepancy of the time lag in the transaction data at these two points in time. In early July, the initial Q2 transaction data (indicated by bars 40, 42 and 44) covers only 8% of the total June transactions (indicated by bar 46) that is known at the later date. The time lag problem for the April Q2 transactions (indicated by bar 48) is significantly smaller, while the time lag problem for the May Q2 transactions (indicated by a bar 50) is intermediate in severity.

To measure the time lag in transaction data used for APVMs, a new metric called Average Data Age (ADA) may be defined to characterize the effective date of valuation time in the valuation database. According to a preferred embodiment, ADA may be defined as:

$$\text{ADA} = \text{Average (End of the Data Coverage} - \text{Transaction Date for Property)} \quad (1)$$

Hence, ADA measures the average age in days prior to the end of the quarter. For example, in chart 38 (FIG. 2) the initial Q2 data at July 1 (indicated by lines 40, 42 and 44 in FIG. 2) may have an ADA of about 60 days. By March of the following year (i.e., approximately 8 months later), after the arrival of new Q2 transaction data, the enlarged Q2 data (indicated by lines 46; 48 and 50) may have an ADA of about 44 days.

The total time lag (TL) may be defined as the sum of the value database processing cycle (PC) and the data lag measured in ADA:

$$TL = PC + ADA \quad (2)$$

Figure 1:
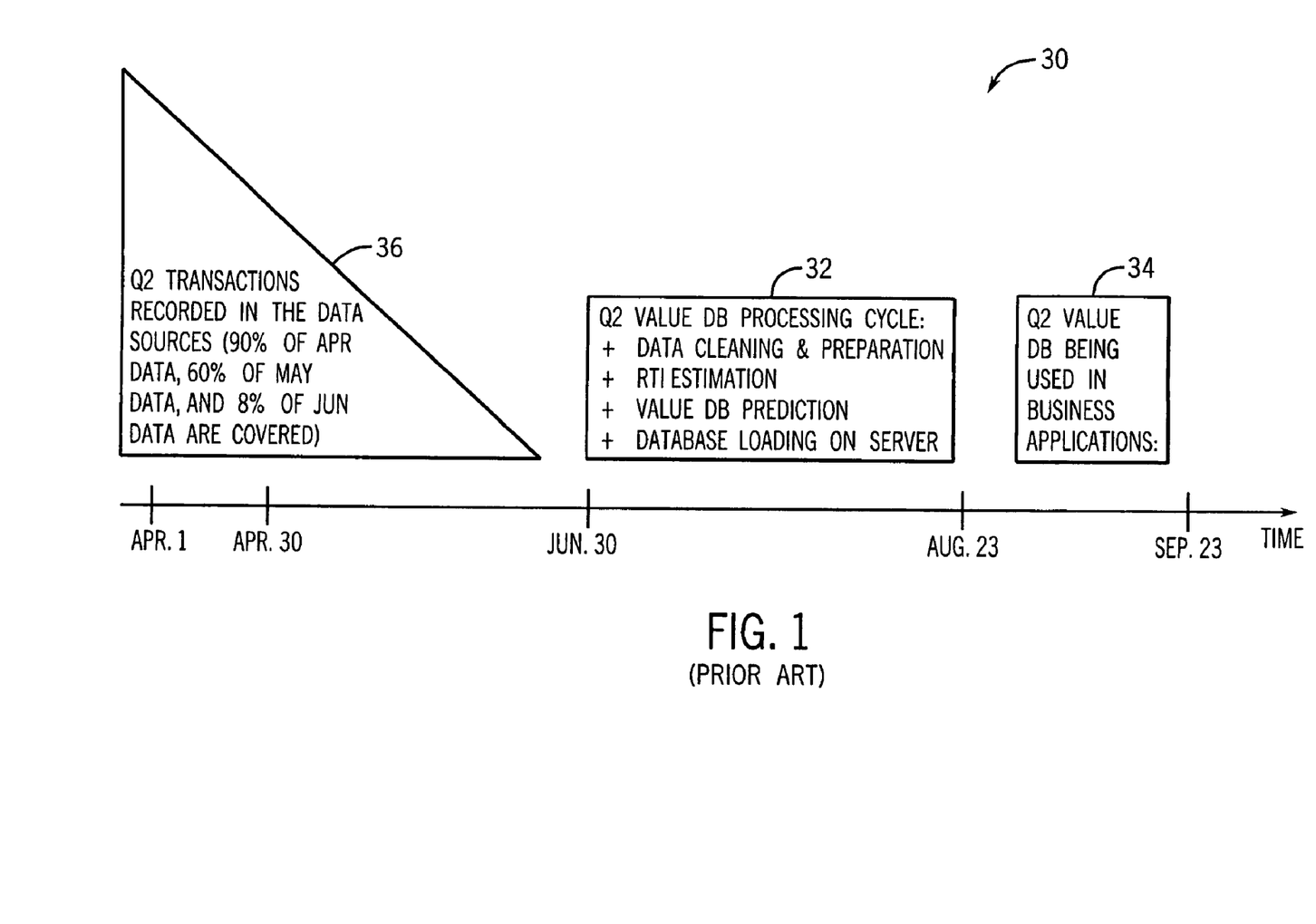
FIG. 1 (PRIOR ART) shows a timeline diagram for a typical second quarter database update cycle.

A typical TL value for a property value database may be; for example, about 120 days, comprising 60 days of data lag plus 60 days of processing time (see FIG. 1). Without adjustment, therefore, value database predictions based on such transaction data will lag the market by 120 days. The adverse impact of this time lag depends on how rapidly the housing market is changing during these 120 days, and in which direction.

According to a preferred embodiment, the time lag problem may be addressed by implementing a valuation adjustment scheme (VAS) with the following two features: (i) a time lag adjustment is used which may be location-specific; and (ii) the adjustment is driven by transaction data.

Figure 3:
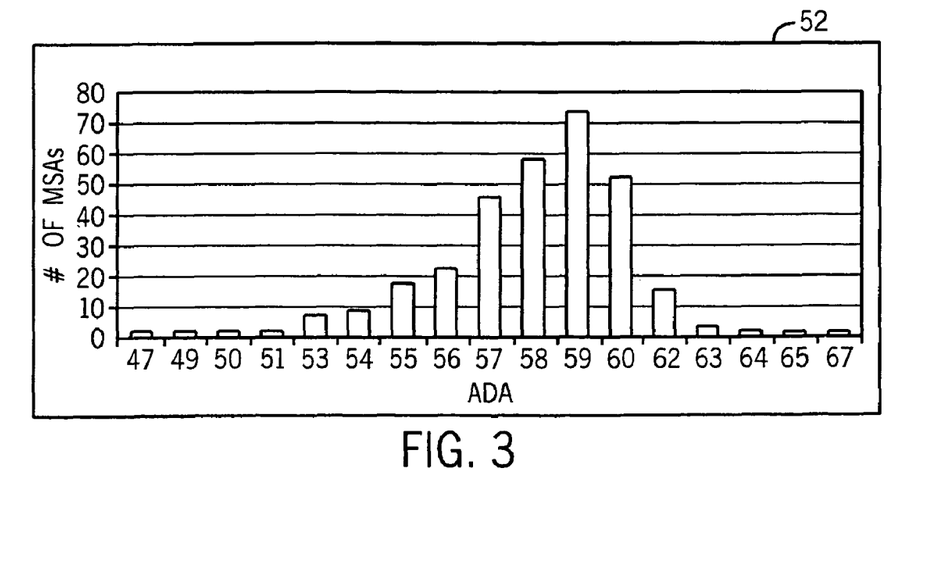
FIG. 3 shows a bar chart diagram that depicts the distribution of a measurement of time lag known as average data age (ADA) across a large number of metropolitan statistical areas (MSAs).

There are two reasons that motivate the use of location-specific time lag adjustments. First, due to different record keeping practices across jurisdictions, the ADA varies across geographical locations. For example, FIG. 3 shows a chart 52 that depicts the ADA distribution across more than 300 MSAs (Q2 data known in early July). Second, and more importantly, the home price (HP) appreciation rate varies by locations.

According to an exemplary embodiment, therefore, a decision is made as to what level of geographical aggregation the time lag adjustment should be calibrated. For reason of data availability, ease of operation, and robust adjustment, a preferable geographical unit that may be considered is the MSA level. However, other geographical units such as the ZIP level could also be utilized.

Continuing with the example provided above (i.e., TL=120), the adjustment needed to eliminate this time lag is the underlying home price (HP) change that covers the total observed time lag TL (e.g., four months in the preceding example). To derive such an adjustment for each MSA, short-term time-series model forecasts can be employed based on MSA-level HP indices. As persons skilled in the art will appreciate, however, forecasting such adjustments is inherently difficult. Time-series models may be good for very short-term forecasts, but they have a tendency to miss turning points. As such, it is preferable that the adjustment be as data-driven as possible.

According to an exemplary embodiment, a solution to the time lag problem is obtained using purchase/sales transaction data. Purchase transaction data is available from a wide variety of sources, and may be both prospective (e.g., loan application data for anticipated sales transactions) and retrospective (e.g., loan data from recently-completed sales transactions). As persons skilled in the art will appreciate, loan application data have the following features: (i) each loan application is associated with a market value of the collateral property; (ii) since a loan will typically be closed on average 40 days after the corresponding loan application is submitted to underwriting, loan application data provides timely and forward-looking housing market signals; and (iii) loan application data, at least for purchase transactions, is reasonably accurate in term of transaction value.

The foregoing features make loan application data particularly suitable for the time lag adjustment. According to an exemplary embodiment, a monthly time lag adjustment may be determined at the MSA level using loan application data. More specifically, loan application data provided by an automated underwriting (AU) engine or other automated or non-automated data source may be used (either alone or in combination with recent historical transaction data) to derive monthly MSA appreciation factors. The monthly appreciation factors are then applied to base value database predictions to bring them up to date.

Figure 4:
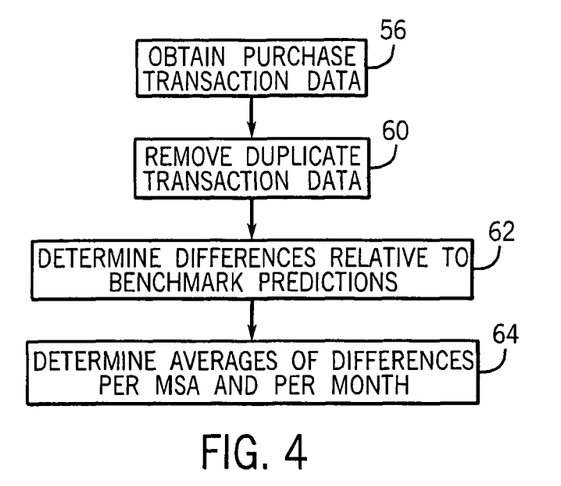
FIG. 4 shows an exemplary procedure for determining a time lag adjustment factor.

FIG. 4 illustrates an exemplary procedure 54 for determining a time lag adjustment factor using purchase transaction, data. The preferred details of procedure 54 are as follows. At block 56, the purchase transaction records are obtained from a source of loan application data (e.g., data from an AU engine) on a monthly basis. The purchase transaction records obtained in block 56 may also include data regarding recently closed purchase transactions.

At block 60, any duplicate transactions may be removed by MSA and by month. For example, if loan application data and recently closed transaction data are both available for the same property and relate to the same transaction, it may be desirable to discard the loan application data in favor of the actual purchase value from the closing. However, it may also be desirable in some cases to discard the actual data from the closing in favor of the loan application data, or to use an average of the two purchase values.

Following block 60, the sale prices of the newly obtained purchase transactions are compared at block 62 with their corresponding benchmark value database predictions to calculate the log differences.

Procedure 54 continues in block 64 with the calculation of a central tendency measure (or average) of the log price difference. According to a preferred embodiment, the median may be used to calculate the average instead of the mean. This is because the former central tendency measure (i.e., median) tends to be more robust against extreme values compared to the mean. However, the mean could be used if desired. The median (or mean) is preferably taken over all of the known transactions for the specific MSA and month in question. This median (or mean) is the adjustment factor for the MSA in the given month.

As explained above, the median (or mean) log-difference is used to calibrate the adjustment factors for each month and for each MSA to remedy the time lag problem. As persons skilled in the art will appreciate, a "thin-data" problem may exist for very small MSAs. With very small MSAs, it can be difficult to distinguish between true volatility and sampling error. The magnitude of the latter depends on the number of records available for each calibration. One outcome of failing to identify and remove the sampling error is more volatile valuation adjustment scheme (VAS) factors. As such, it is preferable to eliminate the sampling error to the extent practical.

There are numerous smoothing methods known to persons skilled in the art that may be used to reduce sampling error caused by small data sets. According to an exemplary embodiment, a solution to the volatility problem is provided by a process known as time aggregation with historical volatility cap. This process, preferably comprises the following five steps:

(i) Derive the monthly MSA-level adjustment factors for time lag: $ATL_{t,m}$.

(ii) Calculate monthly MSA-level VAS implied spot growth rate in house price: $dHP_{t,m} = ATL_{t,m} - ATL_{t-1,m}$.

(iii) Calculate average monthly spot growth rate during the last three months: $\Delta HPm = 3^{-1} \Sigma_t dHP_{t,m}$. Note that since everything is measured in log difference, the arithmetic average here is equivalent to geometric average in house price.

(iv) Derive the spread between each month's HP growth rate in (ii) and the mean growth rate in (iii). If this spread is larger than the historical volatility (in terms of standard error $S_m$) cap for that MSA, the spread is capped at the historical volatility level. The smoothed monthly HP growth rate is:

$$dH_{t,m} = \begin{cases} \Delta HP_m & \text{if } |dHP_{t,m} - \Delta HP_m| < S_m \\ \Delta HP_m + S_m & \text{if } dHP_{t,m} \geq \Delta HP_m + S_m \\ \Delta HP_m - S_m & \text{if } dHP_{t,m} < \Delta HP_m - S_m \end{cases} \quad (3)$$

(v) Reconstruct the smoothed adjustment factors by adding up the smoothed HP growth rate until the month of interest.

As persons skilled in the art will appreciate, volatility smoothing such as described above makes the VAS-adjusted HPI smoother. It is believed that minimal damage occurs to the PPE distribution by such smoothing.

According to an exemplary embodiment, the time lag adjustment may be determined by dividing the U.S. into the top 200 MSAs and nine rural census regions. Any properties not covered in the top 200 MSAs may be combined into the nine census regions, each of which may be treated as an MSA.

Figure 5:
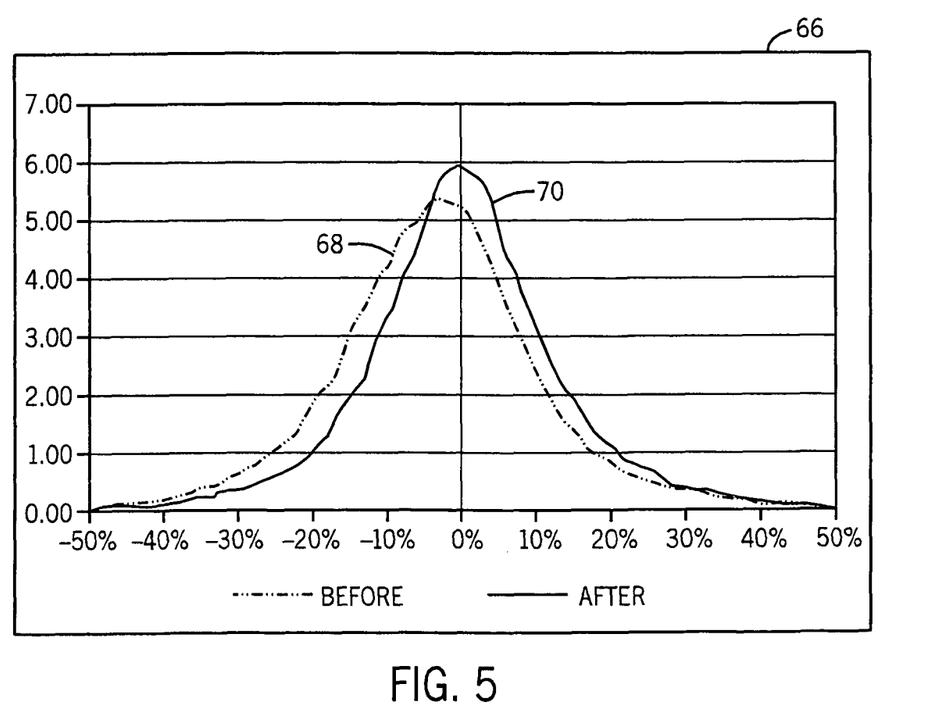
FIG. 5 shows a data plot graph in which the proportional prediction error (PPE) distribution for a test property value database is shown before and after application of a valuation adjustment scheme (VAS).

As described in detail below, the foregoing valuation adjustment scheme (VAS) factors may be applied to benchmark property values provided by APVMs to reduce systematic bias. By correcting for systematic bias (e.g., transformation bias, price tier effect, and time lag), the adoption of a VAS based adjustment makes model-based predictions of property values more accurate with smaller bias and greater precision. For example, FIG. 5 depicts a graph 66 in which the PPE distribution for a test property value database is shown before (indicated by line 68) and after (indicated by line 70) the VAS adjustment. Graph 66 shows that VAS appears to largely eliminate the under prediction problem, and the error distribution is more symmetric.

As explained above, a preferred source of data for deriving the time lag adjustment is loan application data, and particularly loan application data obtained from an AU engine. The use of such loan data is advantageous in that it is forward-looking. In particular, it is typical for about 40 days to elapse between the time a loan application is submitted for processing and when the loan actually closes. As a result, the loan applications filed for processing in one month (e.g., September) may be analyzed to provide a preview of the housing market trend for more than a month in the future (e.g., October and early November), i.e., precisely when the value predictions are most likely to be utilized. Accordingly, the use of underwriting application data to perform the VAS described above provides a property value database essentially in real time.

Moreover, because the foregoing time lag adjustment is calibrated using real or actual data (i.e., data copied directly from a loan application or a closing document) instead of model forecasts, this approach does not suffer from the usual drawbacks of model-based forecasting. As explained above, time series models are known to have great difficulty predicting turning points. By contrast, various tests have shown that the foregoing valuation adjustment scheme (VAS) is capable of early detection of housing market downturns and making the corresponding negative time-lag adjustment for some of the MSAs.

As explained above, the availability of accurate APVM predictions of property values has become a necessity for banks, appraisers, investors in the secondary market, and other financial institutions that use property valuations. For example, APVM predictions are often used as benchmark values for triggering excessive value messages, for fieldwork recommendations, and for granting property inspection waivers. By eliminating the time lag inherent in many APVMs, the under-prediction problem in rising home markets may be eliminated. This will generally result in fewer excessive value messages and more property inspection waiver recommendations.

In one embodiment, the foregoing VAS may be combined with an APVM system. Home price indices (HPIs) are at the core of many APVMs. In these models, HPIs may be estimated for the U.S., nine census regions, 50 states and the District of Columbia, more than 300 MSAs, and more than 10,000 ZIP codes and various counties. One method for estimating such HPIs is the above-described RTI method that uses repeated transaction pairs. RTI provides direct predictions of property values. By contrast, the above-described tax assessment models, hedonic price models and neural network models all rely on the ZIP-level to mark-to-market their value predictions. Other methods for computing HPIs are also known to persons skilled in the art and could be used, either alone or as part of a weighted average of valuations from multiple models. Regardless how the HPIs are derived, they have become pivotal for business applications such as mark-to-market loan-to-value reporting, historical loan performance modeling, post-purchase reviews for property validation, and so on.

Together with the adoption of VAS, a new HPI standard in accordance with an exemplary embodiment may include the following features:

(i) Quarterly ZIP-Level HPI on "Full" Data.
(ii) Smoothing.
(iii) Linear Interpolation.
(iv) HPI Data.

According to this exemplary embodiment, the quarterly ZIP-level HPI may be performed on "full" data by estimating the ZIP-level HPIs only once per quarter. This is done to minimize the well-known problem of revision bias due to time lag (e.g., see the initial triangular shape 36 of the Q2 data in FIG. 1). That is, rather than estimating the quarterly ZIP-level HPI immediately after the calendar quarter ends, it may be preferable to wait for a period of time (e.g., two additional months) until a substantial proportion of transaction data becomes available. With this approach, the first quarter (Q1) HPIs would, for example, be estimated in June using data received through May 31, the second quarter (Q2) HPIs would be estimated in September using data received through August 31, the third quarter (Q3) HPIs would be estimated in December using data received through November 30, and the fourth quarter (Q4) HPIs would be estimated in March of the next year using data received through the end of February.

The smoothing feature of the exemplary embodiment is directed at solving the small-sample problem discussed above. The directly estimated ZIP-level HPIs are subject to sample size-induced extra volatility. Several index smoothing methods are well known to persons skilled in the art and widely used in the industry. One such method involves decomposing the raw time series (in this case, it is the original HPI) into a trend component, a seasonality component, and an irregular component. The smoothed HPI is the original HPI minus the irregular component. The smoothed ZIPs obtained using this method have been shown to reduce the degree of unwanted volatility, provide more accurate property-level value predictions, and reduce the degree of revision bias.

Figure 6:
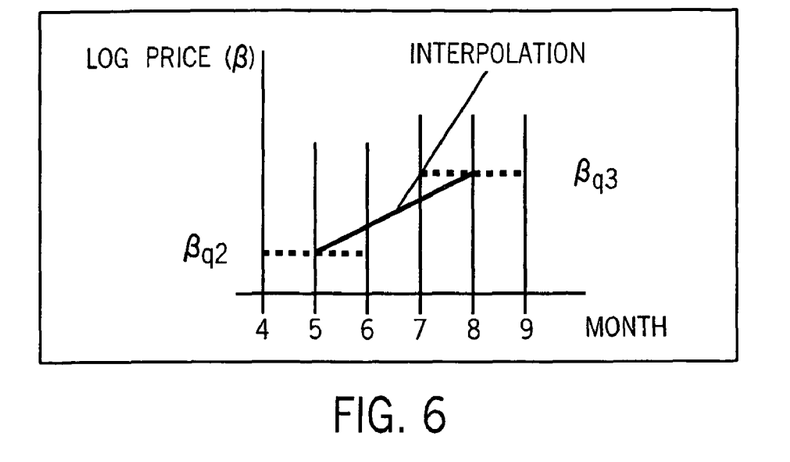
FIG. 6 shows the derivation of monthly home price indices (HPIs) using simple linear interpolation in log prices.

From this quarterly ZIP HPI, monthly indices may be derived by simple linear interpolation in log prices as shown in FIG. 6. In this example, if $\beta_{q2}$ and $\beta_{q3}$ represent the second and third quarter estimates (in log prices), respectively, then the following monthly beta index numbers (in log prices) may be defined for May through August using monthly linear interpolation:

| April: | Also needs $\beta_{q1}$ |
|---|---|
| May: | $\beta_{m5} = \beta_{q2}$ |
| June: | $\beta_{m6} = \beta_{q2} + (\beta_{q3} - \beta_{q2})/3$ |
| July: | $\beta_{m7} = \beta_{q2} + 2 * (\beta_{q3} - \beta_{q2})/3$ |
| August: | $\beta_{m8} = \beta_{q3}$ |
| September: | Also needs $\beta_{q4}$ |

Figure 7:
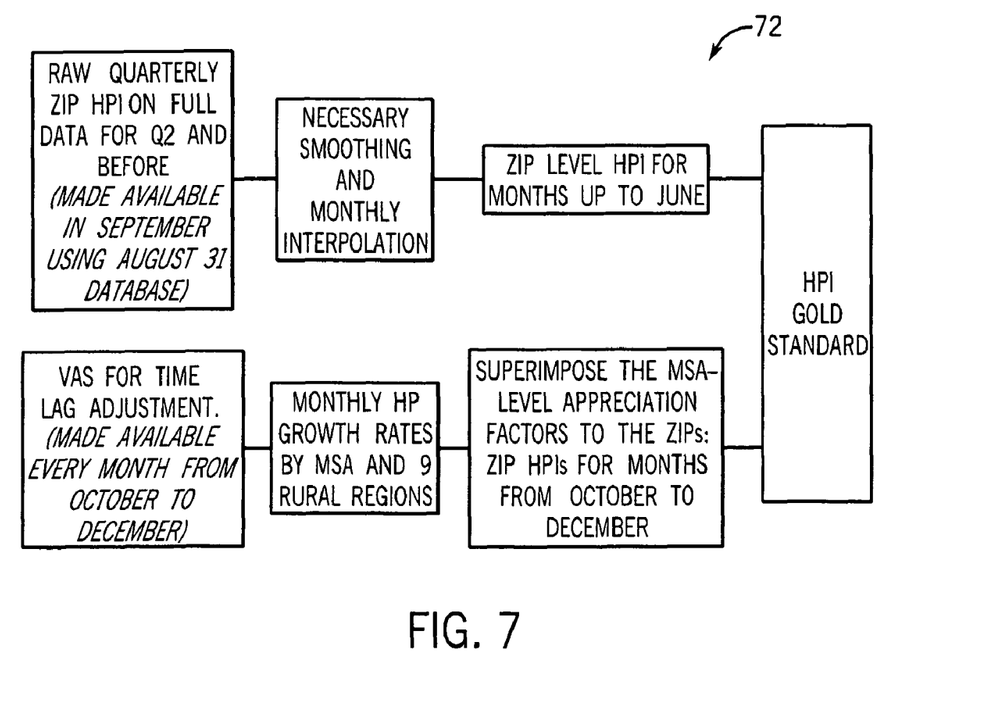
FIG. 7 shows a dataflow diagram that combines historical RTI based estimation and VAS-induced HP growth rates to obtain adjusted HPIs.

The HPI data feature involves combining the historical RTI based estimation at the ZIP level and the VAS-induced HP growth rates at the MSA level to obtain an HPI "Gold Standard." FIG. 7 shows a flow chart 72 that illustrates how this is done from October to December.

Figure 8:
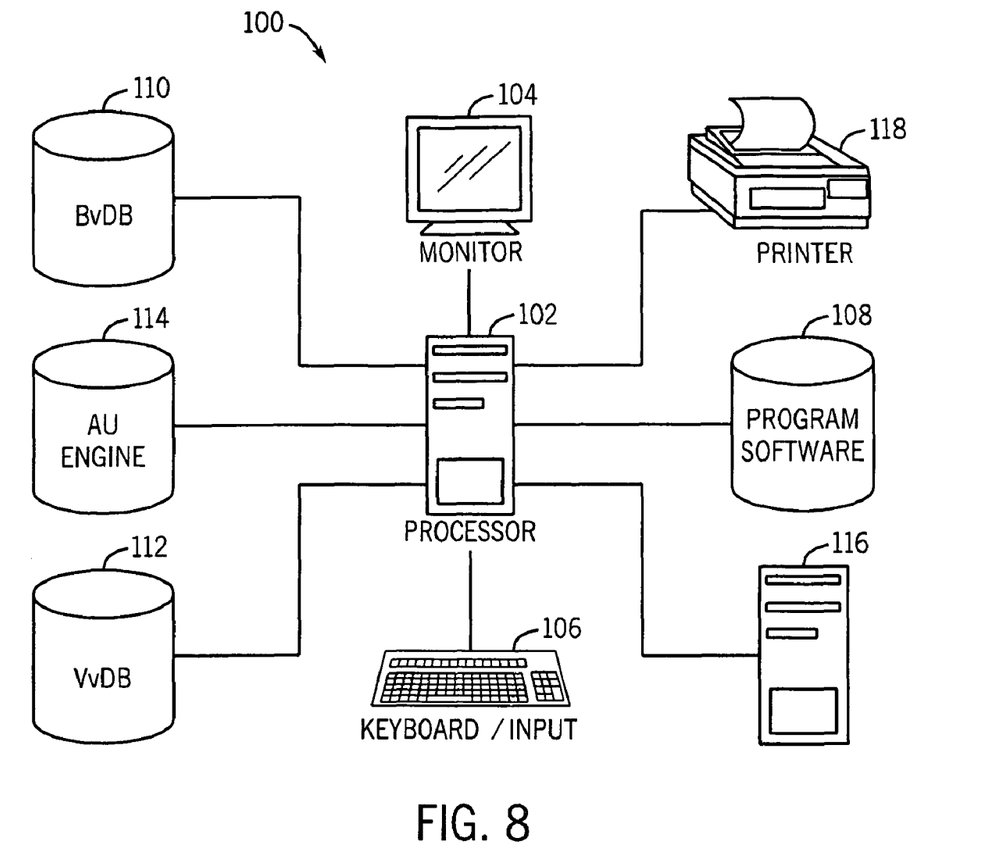
FIG. 8 shows a system configured for performing a VAS to improve the property value predictions provided by an APVM.
Figure 9:
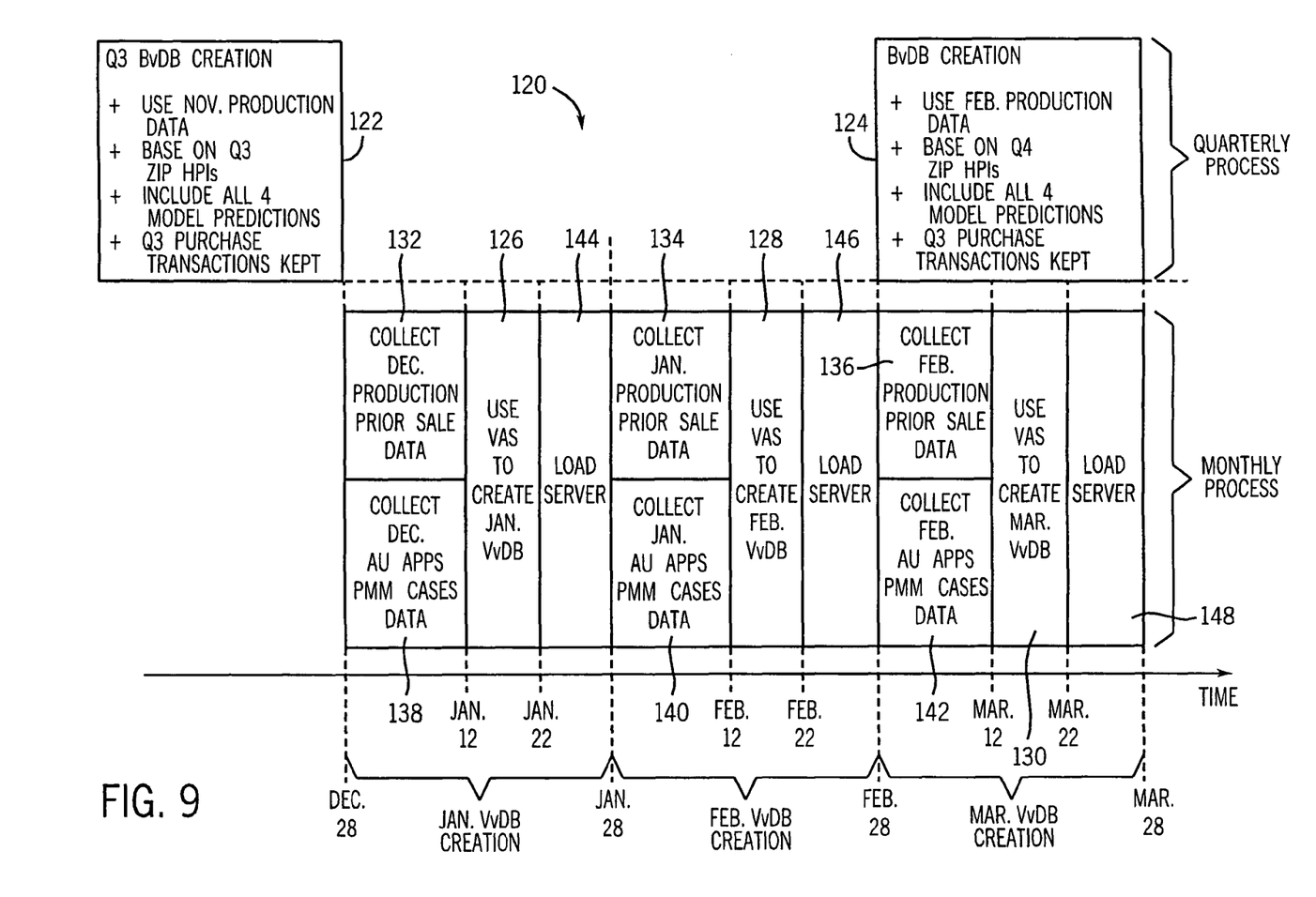
FIG. 9 shows a timeline diagram for a quarterly benchmark value database update and three monthly VAS-adjusted value database updates based on the benchmark values.

Turning now to FIGS. 8 and 9, a system 100 is configured for performing a VAS as described above to improve predictions from an APVM. In the illustrated embodiment, system 100 includes a computer (or processor) 102, a monitor 104, a keyboard 106, program software 108 (e.g., VAS logic, APVM logic, AU engine logic), a benchmark value database (BvDB) 110 and a VAS-adjusted database (VvDB) 112). In addition, system 100 may be connected (on an intermittent, periodic or continuous basis) to an AU engine 114 and other computers 116 for transmitting/receiving data (e.g., loan application data, property value predictions, HPIs, transaction data from recent closings, etc.). Moreover, system 100 may include a printer 118 for printing hard copy reports. System 100 may further include, or be in communication with, a loan origination system (e.g., a software package configured for originating loan applications).

According to an exemplary embodiment, AU engine 114 is configured to assist mortgage lenders with making informed credit decisions on conventional conforming, non-conforming and government loans. Engine 114 provides fast and objective risk assessment, reduced data entry requirements, reduced documentation, and comprehensive underwriting reports. Engine 114 is configured to receive and store loan application data for a loan associated with a borrower. Loan application data may include at least one item of data relating to an individual loan such as borrower information, property information, locked interest rate, product type, status of the loan, lock expiration date, scheduled closing date, loan purpose, loan source, loan size, loan-to-value ratio, lender identification, number of months of cash reserves of borrower, underwriting criteria (e.g., available assets, credit history, credit score, property type, housing and expense ratios, employment status, etc.), and so on.

Figure 12:
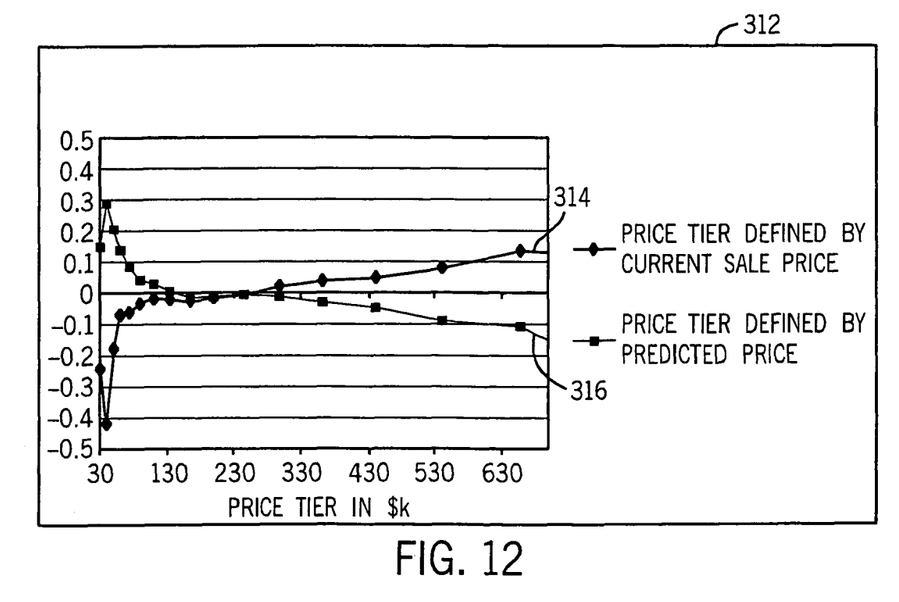
FIG. 12 is a line chart diagram that illustrates a similar typical pattern of price tier effect.

As persons skilled in the art will appreciate, the various elements shown in system 100 of FIG. 12 may be in the same or a different physical location as computer 102. That is, the connections illustrated in FIG. 12 between computer 102 and the other elements (e.g., BvDB 110, VvDB 112, AU engine 114) of system 100 are intended to represent communication paths (rather than physical connections) and thus may represent direct cable connections, network connections such as LAN, WAN, Ethernet, Intranet, Internet, dial-up, wireless), or other communication mechanisms and technologies. Moreover, many of the components shown in FIG. 12 and the various components described in connection with other figures herein could be resident on computer 102 rather than provided by separate elements in communication with computer 102.

According to an embodiment, BvDB 110 may be created for each update of the ZIP-level HPIs on a quarterly basis as indicated at 122 and 124 in an exemplary timeline diagram 120 (see FIG. 9). Hence, the values in BvDB 110 may be used as the base or benchmark values for determining monthly VAS adjustments needed to create each monthly VvDB 112.

As indicated above, VvDB 112 may be created corresponding to VAS adjustments on a monthly basis (indicated by blocks 126, 128 and 130 in FIG. 9). That is, VvDB 112 may be created each month by taking the values in the most recent (quarterly) BvDB 110 and marking them forward to the current month. For example, the January, February, and March monthly VvDBs 112 may be computed (as indicated by blocks 126, 128 and 130) based on the third quarter BvDB 110 created in September.

After each quarterly BvDB 110 is constructed, any newly arrived historical transaction data (indicated by blocks 132, 134 and 136) is pooled together with loan application data (indicated by blocks 138, 140 and 142), which preferably is purchase money mortgage (PMM) data from AU engine 114. This pooled data is used in the construction of the monthly MSA-level adjustments for time lag (as indicated by blocks 126, 128 and 130). For example, when VvDB 114 is created for January, February and March based on the third quarter (Q3) BvDB 110 (which is calculated in block 122), all of the MSA-level adjustment factors will be based on the union of the loan application data (from AU engine 114) and any recently obtained real transaction data obtained since October. Finally, the monthly VvDB 114 values are loaded onto a server for use by business applications (indicated by blocks 144, 146 and 148).

According to an exemplary embodiment, the monthly MSA-level adjustments used to mark the BvDB 110 values forward to the current month for VvDB 114 are computed as follows. Suppose the current time period is T, then the quarterly house price appreciation factor (QAPP) from time period (T-j) to T is:

$$QAPP_j = \exp(\hat{\beta}_T - \hat{\beta}_{T-j} - {}^{TR}D_{T-j}\hat{\gamma}_{T-j} - {}^{CR}D_{T-j}\hat{\alpha}_{T-j}) \quad (4)$$

Next, the monthly house price appreciation factor (MAPP) can be computed as follows. As explained above, BvDB 110 is preferably produced with purchase transaction data at some point in time after the end of the quarter (e.g., two months later). For example, the Q2 benchmark value database may be produced when the August repeat transactions data set is available for HPI estimation. If it is assumed that the full transaction data is available for Q2 and that triangular shaped transaction data is available for July and August, then the $QAPP_1$ will be the HP appreciation from mid May to mid July. By using the interpolation method discussed above (see FIG. 6), the monthly HP appreciation can be obtained from mid May to mid June as:

$$MAPP_1 = \exp[\log(QAPP_1)/2] \quad (5)$$

Figure 10:
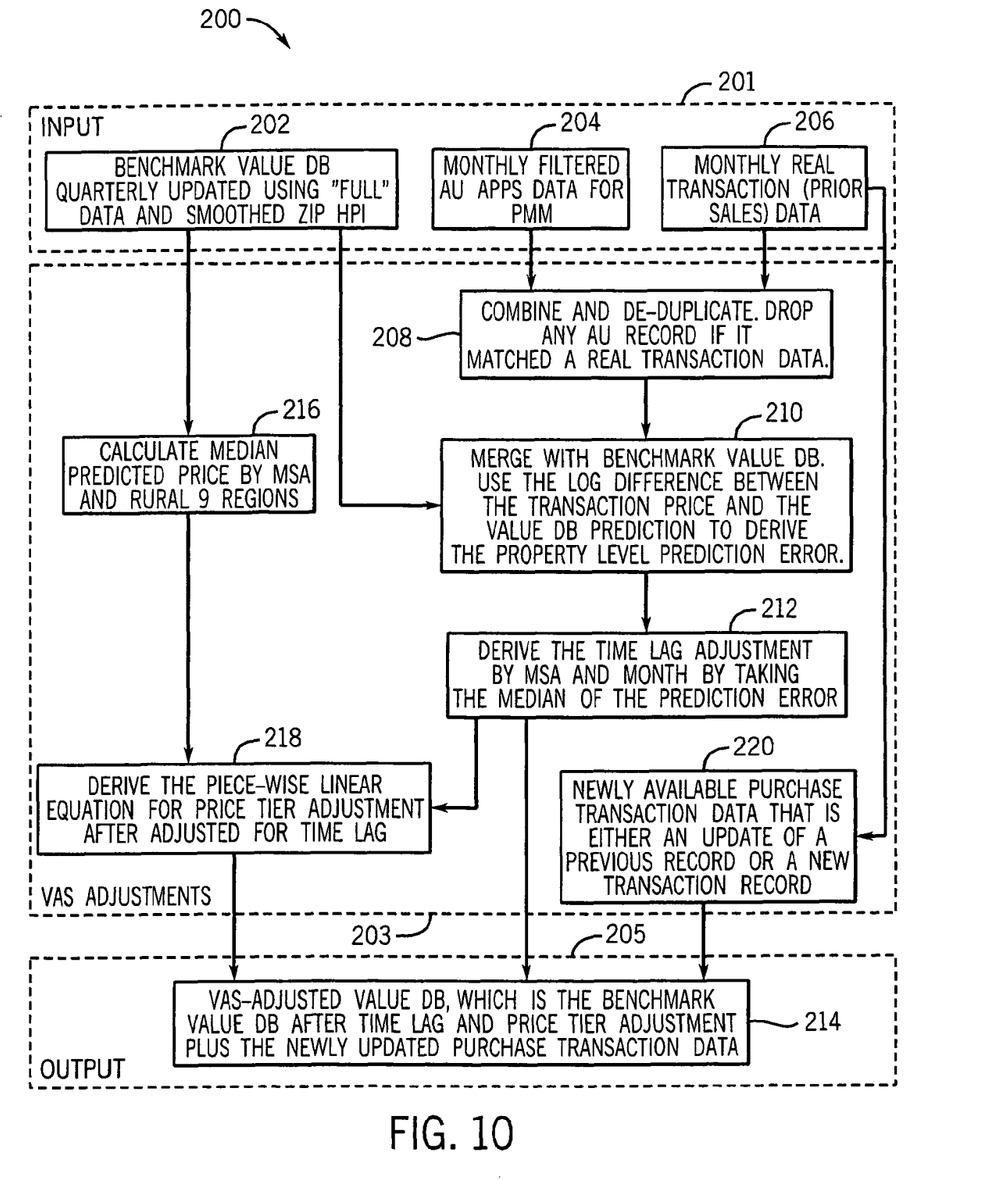
FIG. 10 is a dataflow diagram for an exemplary process that creates a monthly VAS-adjusted value database.

Turning now to FIG. 10, a dataflow diagram is illustrated in connection with an exemplary process 200 for creating a monthly VAS-adjusted value database (e.g., VvDB 112 in FIG. 8). The dataflow diagram for process 200 is illustrated with three distinct sections, including: an input section 201 (at the top), a VAS adjustments section 203 (in the middle), and an output section 205 (at the bottom).

Input section 201 shows the three distinct types of input for process 200, including: benchmark property value predictions 202 (e.g., values from BvDB 110), monthly loan application data 204 (e.g., PMM transaction data from AU 114), and monthly real transaction (i.e., prior sales) data 206 from recent closings.

Turning now to VAS adjustments section 203, block 208 receives loan application data 204 and prior sales data 206 and removes any duplicates. Next, the combined/de-duplicated purchase transaction data 204, 206 is merged with the corresponding benchmark value predictions 202 at block 210, which calculates the log difference between each pair of values (i.e., the actual property value and the predicted benchmark value) to derive the property level prediction error.

The output of block 210 is then provided to a block 212, which derives the time lag adjustment by MSA and month. In the illustrated embodiment, this is accomplished by taking the median (or mean) of the prediction error. The time lag adjustment values are then provided (along with other data specified below) to a final block 214, which is in output section 205.

Returning again to block 202 in input section 201, the benchmark value predictions 202 are also provided to a block 216 in VAS section 203. Block 216 uses the benchmark values to calculate the median predicted price by MSA and nine rural regions. The output of block 216 is provided to a block 218, which also receives the time lag adjustment factors from block 212. Block 218 uses this information to derive the piece-wise linear equation for price tier adjustment after adjustment for time lag (as discussed below with reference to FIGS. 11-14). The output of block 218 is provided to final block 214 in output section 205

B. Price Tier Bias Adjustment

Returning now to block 206 in input section 201, the monthly real (prior sales) data 206 is provided to a block 220 in VAS section 203. Block 220 filters the data to identify any newly available purchase transaction data that is either an update of a previous record or a new transaction record on to block 214. The filtered data is provided to final block 214.

Turning now to output section 205, block 214 uses the data provided by blocks 212, 218 and 220 to derive a VAS-adjusted value database (e.g., VvDB 114) as described above. Thus, the output of block 214 is the benchmark value database 202 after time lag and price tier adjustment plus the newly updated purchase transaction data.

With reference now to FIGS. 11-14, an exemplary procedure will be described for identifying and removing the effects of price tier bias on APVMs. As mentioned above, the price tier effect refers to the tendency of some APVMs to under-predict low-priced properties and over-predict high-priced properties, where the price tier is defined by predicted values.

Figure 11:
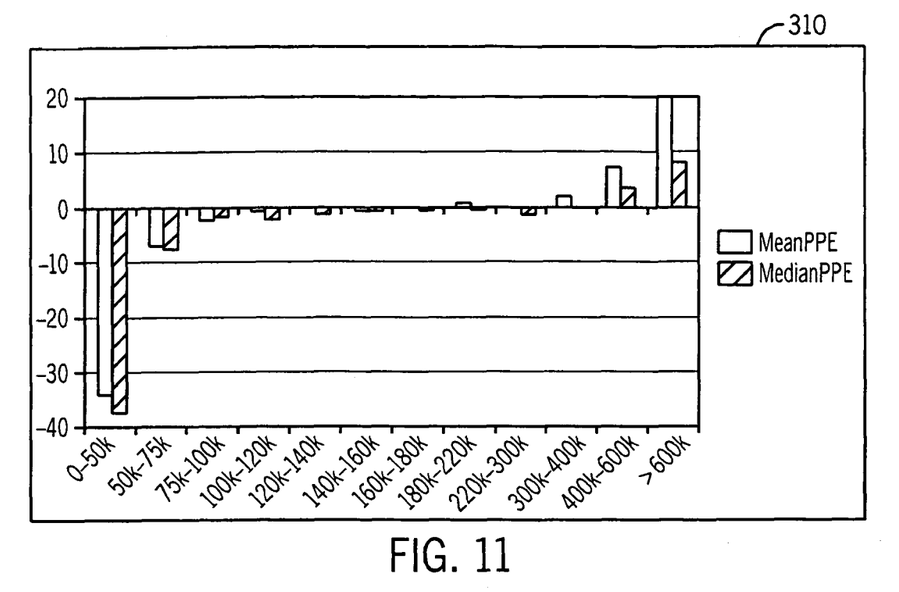
FIG. 11 is a bar chart diagram showing a typical pattern of price tier effect in property valuations obtained by APVMs.

In some APVMs, this price tier effect can be relatively large and quite robust as well. When present, it tends to be prevalent in many slices and dices of the data. FIG. 11 shows a chart 310 that depicts a typical pattern of price tier effect. In the illustrated example, the model under-predicts properties in the less-than $50K category by as much as 35%. Similarly, FIG. 12 shows a different type of chart 312 that depicts a similar typical pattern of price tier effect (indicated by a line 314).

Before discussing possible reasons for and solutions to the price tier effect problem, it is noted that in some APVMs the price tier effect may be reversed if the actual observed price is used instead of the predicted price to define the price tier. That is, some APVMs may over-predict the lower priced properties and under-predict the higher priced properties (e.g., see line 316 in chart 312 in FIG. 12) when the price tier is defined by the actual observed price. Hence, chart 312 shows a seemingly contradicting fact: the same APVM may either over-predict or under-predict low-priced properties, depending upon how the price tier is defined, i.e., by using current sale price or using predicted price. In the illustrated example, the Y-axis is the average $\log(P) - \log(\hat{P})$ for each price bucket.

Some APVMs rely heavily on ZIP-level home price indices (HPIs) that are estimated using the repeated transaction index (RTI) methodology. In the RTI model, the predicted value is derived from a previous sale value and marked forward via the estimated HPI. Let s<t be two repeated sale dates for a property, and let $P_s$ and $P_t$ be the two observed prices. Then, the predicted price for time t is:

$$\hat{P}_t = P_s * [HPI_t / HPI_s] \quad (6)$$

where $\hat{P}_t$ is the predicted value at time t, upon taking the prior sale value $P_s$ as the base. This implicitly assumes that the prior sale value is a true benchmark value.

It is widely accepted that properties within every ZIP may be heterogeneous in price range, from starter homes to multimillion-dollar mansions. However, there is anecdotal evidence that different price tiers appreciate at different paces at times. The measurement error hypothesis states that (i) both $P_s$ and $P_t$ are measured with errors, and (ii) the two errors are not perfectly correlated.

Compared with the underlying intrinsic value of the property, there are idiosyncratic errors in both $P_s$ and $P_t$. It is extremely unlikely that the two errors, at time s and at time t, are perfectly correlated. A lower-than-average draw reflected in $P_s$ does not necessarily imply a similar lower-than-average draw reflected in $P_t$. This is especially so considering that the buyer at time s of the property becomes the seller of the same property at time t.

Figure 13:
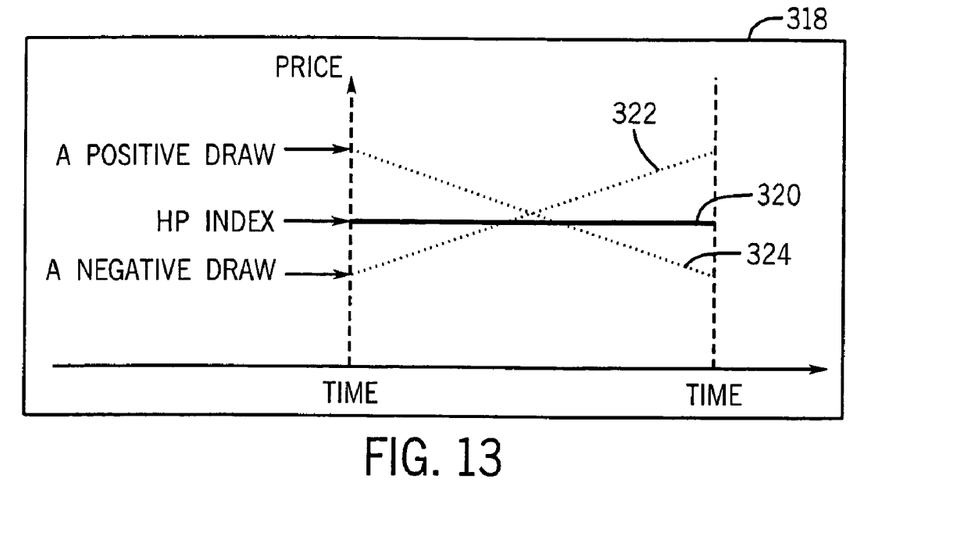
FIG. 13 shows a ZIP-level HP index and two observed property values at different times centered around the same mean value.

So long as the two errors are not perfectly correlated, the two facts summarized in the price tier effect puzzle above can be reconciled. To illustrate this, a simple example is provided with reference to a chart 318 in FIG. 13. To facilitate the explanation, the following three simplifying assumptions are made:

(i) A ZIP consists of a large group of identical houses (i.e., the houses in the same ZIP-code have the same intrinsic value).

(ii) There is no property appreciation from time s to time t (i.e., the HPI is flat).

(iii) The observed prices $P_s$ and $P_t$ for a property are determined by two random draws, at time s and at time t, around the same mean value. The two random draws are independent.

Under these three assumptions, the property that received a negative draw in time s and the property that received a positive draw in time s will have the same distribution at time t.

As shown in FIG. 13, since ZIP-level HP index 320 is flat, using equation (6), the observed price $P_s$ at time s will be exactly the predicted price $\hat{P}_t$ at time t for each property. Since the random draws at time s and at time t are independent, $\hat{P}_t = P_s$ will more likely be smaller than $P_t$ when $P_s$ is below average (indicated by line 322); and $\hat{P}_t = P_s$ will be bigger than $P_t$ when $P_s$ is above average (indicated by line 324). This is consistent with both curve 314 and curve 316 in price-tier effect chart 312 in FIG. 12.

To derive the adjustment needed to correct for the price tier effect, the price tier effect may be investigated by recreating a testing and training sample property valuation database (ttspvDB) without the adverse impact of time lag. The price tier (PT) is defined as the log difference between the predicted property value ($\hat{P}_i$) and the corresponding median house price ($M_j$) for the Metropolitan Statistical Area ($MSA_j$) where the underlying property is located:

$$PT_i = \log(\hat{P}_i) - \log(M_j). \quad (7)$$

The reasoning behind this definition is that: (i) price tier is location specific (e.g., a house considered high priced in one locale may not be considered high priced another locale); and (ii) location specific median home price is a reasonable measure of price tier. For this investigation, a data set of predicted median house prices may be constructed for the top 200 MSAs and nine rural census regions using all of the predicted property values in a second quarter 2002 database (2002q2 DB).

To recreate a data set without any time lag, the ttspvDB may be constructed from the 2002q2 DB, which is based on data as late as June 2003. All transactions that took place in the $3^{rd}$ quarter of 2002 are maintained.

For all the sales transactions, the corresponding predicted values in the ttspvDB are found. Next, the predicted values are updated to the corresponding month (July to September) using the time lag adjustment procedure discussed below. According to an exemplary embodiment, only the purchase transactions are used to minimize the impact of any appraisal bias.

To derive the price tier adjustment form, the non-parametric relationship between $u = \log(P_{ti}) - \log(\hat{P}_t)$ and PT is explored, controlling the month of the transaction effect (July, August, September). The form of the price tier adjustment can be found based on this analysis. For example, in ttspvDB, the price tier adjustment was found to take the form of a piece-wise linear equation, which has three knots at −1.0, −0.45, and 1.2. The model parameters are:

$$\begin{aligned} APT &= -0.22, & \text{if } PT < -1.0 \\ &= -0.4 * (PT + 0.45), & \text{if } -1.0 < PT < -0.45 \\ &= -0.05, & \text{if } PT > 1.2 \end{aligned} \quad (8)$$

The cap of −0.05 for high price tier and −0.22 for lower price tier are introduced to avoid unwarranted over-adjustment. Of course, persons skilled in the art will recognize that the price tier adjustment for different APVMs will take different forms and/or have different knots (both in magnitude and in number) than that described in the foregoing example.

Figure 14:
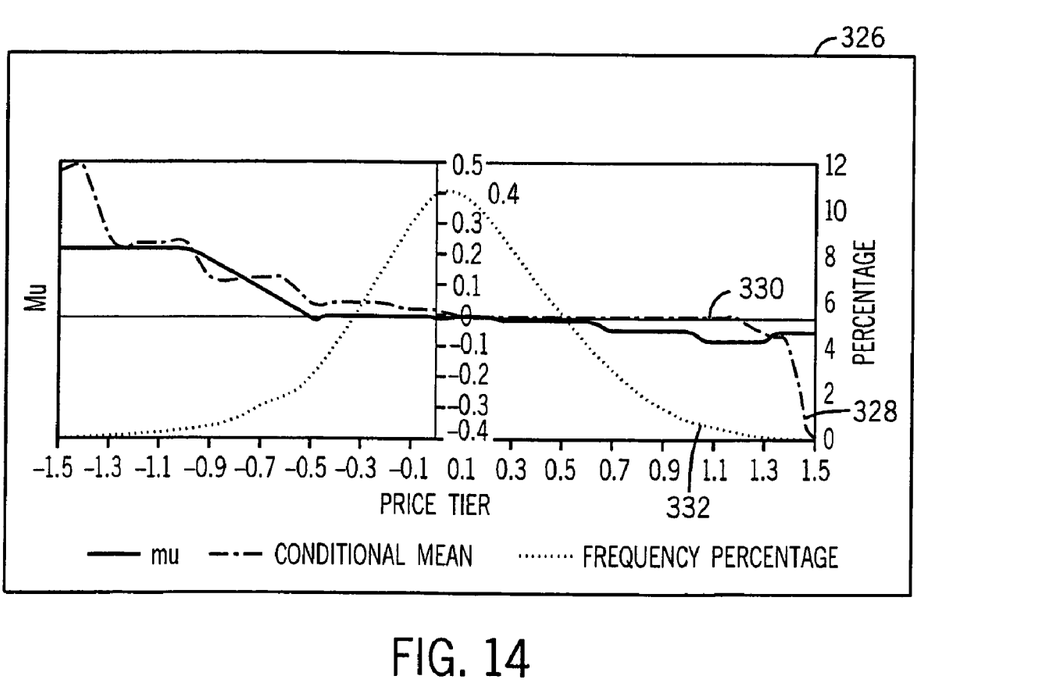
FIG. 14 is a data plot diagram that illustrates an actual price tier effect, a proposed piece-wise linear adjustment, and a distribution of properties for the price tier.

FIG. 14 shows a chart 326 that illustrates the pre-adjusted (or actual) price tier effect (indicated by line 328), the proposed piece-wise linear adjustment (indicated by line 330), and the distribution of properties for the price tier (indicated by line 332).

C. Transformation Bias

In addition to time lag and price tier effect, transformation bias can also affect the accuracy of predictions from APVMs. As mentioned above, transformation bias results whenever APVMs are specified in terms of the logarithm of property value. The industry standard of assessing the accuracy of model-based predictions is Proportional Prediction Error (PPE), which is based on the property value. Because there is inherent disconnect between the two, estimation of the APVM under the mean square errors criterion results in non-mean zero PPE distribution.

Using simplified notation, a property valuation model can be expressed in terms of logarithm of the value or price ($P_i$) of a particular property and in linear regression format as:

$$Y_i = \log(P_i) = X_i \beta + \epsilon_i, \quad (9)$$

with the assumptions that $E[\epsilon_i | X] = 0$ and $\epsilon_i \sim N(0, \sigma^2)$, where $\epsilon_i$ is the disturbance term that is assumed to follow a normal distribution with zero mean.

Then, let $\hat{Y}_i = X_i b$ denote the predicted value of $Y_i = \log(P_i)$, where b is the estimated value for the parameter β using the ordinary least squares method. The predicted property value is $\hat{P}_i = \exp(\hat{Y}_i)$. Hence, the model residual vector is:

$$R_i = \log(P_i) - X_i b = Y_i - \hat{Y}_i. \quad (10)$$

The distribution of R is derived from that of ε. It can be shown that the whole vector $R=(R_1, R_2, \ldots R_n)$ follows a multivariate normal distribution with mean zero.

To gauge the performance of an APVM, PPE is often used as a measure of how close the prediction is to the real value. For a specific property, PPE is defined as:

$$PPE_i = (\hat{P}_i - P_i)/P_i = \hat{P}_i/P_i - 1 \quad (11)$$
$$= \exp\{\hat{Y}_i - Y_i\} - 1 = \exp\{-R_i\} - 1$$

The mean value of PPE, under the normal distribution condition, is:

$$E[PPE_i] = E[\exp\{-R_i\}] - 1 = \exp\{½\mathrm{Var}[R_i]\} - 1, \quad (12)$$

which is greater than zero unless $\mathrm{Var}[R_i]=0$.

The transformation bias may be corrected by estimating the variance of the error term, $\mathrm{Var}[R_i]$. As discussed above, the predicted value for each property covered in a property valuation database may be the result of either one or more APVMs. In either case, associated with the (weighted) mean prediction ($PWM_i$) of the property value, there is also an estimated (weighted) standard error ($S_i$) that measures the degree of uncertainty of that mean prediction. The standard error ($S_i$) may be used to derive an upper value ($PWU_i$).

A property specific standard error ($S_i$) can be used to estimate $\mathrm{Var}[R_i]$ as follows. From the equation:

$$\log(PWU_i) = \log(PWM_i) + 1.96 * S_i, \quad (13)$$

the property specific standard error is determined as:

$$S_i = [\log(PWU_i) - \log(PWM_i)]/1.96 \quad (14)$$

Combining everything together, the following new estimate is provided for $P_i$:

$$\overline{P}_i = \exp\{-½S_i^2\} * \hat{P}_i. \quad (15)$$

Accordingly, if the average value of S in a set of data is, for example, 0.13, this amounts to, on average, an over-prediction of 0.85% (=0.5*0.13*0.13) without adjustment.

Two additional comments can be made on transformation bias. First, the transformation bias discussed above appears only in the mean of PPE. Fundamentally, this is due to an inequality regarding the expectation of non-linear functions. This inequality postulates that if Y is a convex function of Z, such as Y=exp(-Z)-1, then the mean of Y is larger than the function value of Y evaluated at the mean of Z. Therefore, the mean-zero of Z and mean zero of Y=exp(-Z)-1 are inherently incompatible. If the focus is on the median of PPE, then the problem does not exist because median is preserved by monotonic transformations.

A second comment is that, to take advantage of the notation set up above, it is often necessary to look at how the transformation bias is related to other systematic bias problems (e.g., price tier effect and time lag) in the APVM being examined. Due to effects of systematic bias in the APVM such as price tier effect and time lag, the assumption in equation (9) that the error term is mean-zero may not actually be valid. That is, $E[\epsilon|X]=\mu_i \neq 0$. The implications of such non-mean-zero error can be explored as follows.

If this condition is incorporated into the previous derivation, then equation (12) becomes:

$$E[PPE_i] = E[\exp\{-R_i\}] - 1 = \exp\{-\mu + ½\mathrm{Var}[R_i]\} - 1. \quad (16)$$

To propose an adjustment from $\hat{P}_i$ to $\overline{P}_i$ so that $E[PPE]=0$, the following adjustment factor is needed:

$$\overline{P}_i = \exp\{\mu_i - ½\mathrm{Var}[R_i]\} * \hat{P}_i. \quad (17)$$

This adjusted $\overline{P}_i$ makes the PPE unbiased, because:

$$E[PPE_i] = E[\overline{P}_i/P_i - 1] \quad (18)$$
$$= \exp\{\mu_i - 1/2\ \mathrm{Var}[R_i]\} * E[\exp\{-R_i\}] - 1$$
$$= \exp\{\mu_i - 1/2\ \mathrm{Var}[R_i]\} * \exp\{-\mu_i + 1/2\ \mathrm{Var}[R_i]\} - 1 = 0$$

Thus, the bias adjustment solution reduces to getting reasonable estimates for $\mathrm{Var}[R_i]$ and $\mu_i$. The estimation of $\mathrm{Var}[R_i]$ is given by equation (14) above. The characterization and the estimation of $\mu_i$ was discussed above in connection with the discussions of the price tier effect and time lag.

Many other changes and modifications may be made to the present invention without departing from the spirit thereof. For example, although the embodiments of the present invention are described above in the context of valuations provided by APVMs, the foregoing invention could also be used to remove systematic bias from valuations calculated by more traditional methods. As another example, other types of systematic bias besides time lag, price tier effect and transformation bias may be removed or reduced using systems and methods such as outlined above. The scope of these and other changes will become apparent from the appended claims.

What is claimed is:

1. Machine-readable media having program code stored therein, the program code being executable by a processor to perform a method for estimating property values, comprising:
   obtaining a first estimate of a property value from a first property valuation database, the first estimate exhibiting time lag bias due to a time lag between collection of property value data used by the first property valuation database and generation of the first estimate by the first property valuation database;
   obtaining loan application data from an underwriting engine, the loan application data being for loans that have not closed at the time the loan application data was received by the automated underwriting engine, the loan application data including sale prices;
   deriving a time lag adjustment factor based on the sale prices; and
   adjusting the first estimate to reduce the time lag bias using the time lag adjustment factor, by a valuation adjustment scheme logic implemented by the instructions stored in the machine-readable media, thereby providing a second estimate having reduced time lag bias.

2. The machine-readable media of claim 1, wherein the first property valuation database contains a plurality of property value predictions derived by an automated property valuation model.

3. The machine-readable media of claim 2, wherein the automated property valuation model is at least one of a repeated transactions index model, a tax assessment model, an hedonic price model based on property characteristics, and a neural network model based on property characteristics.

4. The machine-readable media of claim 3, wherein the first estimate is based on a weighted average of at least two different automated property valuation models.

5. The machine-readable media of claim 1, wherein the first estimate exhibits systematic bias.

6. The machine-readable media of claim 5, wherein the systematic bias is at least one of transformation bias, price tier effect and time lag.

7. The machine-readable media of claim 1, wherein the time lag adjustment factor is derived on a monthly basis.

8. The machine-readable media of claim 7, wherein the time lag adjustment factor is location-specific.

9. The machine-readable media of claim 7, wherein the time lag adjustment factor is specific to one of a Metropolitan Statistical Area (MSA) level and a zip-code.

10. The machine-readable media of claim 1, further including removing duplicate loan data by location and month.

11. The machine-readable media of claim 7, further including smoothing the time lag adjustment factor to reduce size-induced volatility.

12. The machine-readable media of claim 1, further comprising storing the second estimate in a second property valuation database.

13. The machine-readable media of claim 1, wherein the first property valuation database is updated on a quarterly basis.

14. The machine-readable media of claim 13, further comprising deriving monthly zip-level home price indices (HPI) from the first property valuation database at two different points in time using linear interpolation.

15. The machine-readable media of claim 14, further including smoothing the zip-level HPI to reduce size-induced volatility.

16. The machine-readable media of claim 1, further comprising computing the first property valuation database on a quarterly basis using time-delayed data.

17. The machine-readable media of claim 16, wherein the time-delayed data comprises purchase transaction data for a recently ended quarter including updates received through at least about one month after the end of the quarter.

18. The machine-readable media of claim 16, wherein the time-delayed data comprises purchase transaction data for a recently ended quarter including updates received through at least about one month after the end of the quarter.

19. The machine-readable media of claim 1, wherein the time lag adjustment factor is derived by comparing sale prices of obtained loan application data with corresponding benchmark value database predictions.

20. The machine-readable media of claim 19, wherein the time lag adjustment factor is further derived by computing log differences between the sale prices and their corresponding benchmark value database predictions.

21. The machine-readable media of claim 20, wherein the time lag adjustment factor is further derived by computing the median of the log differences.

22. The machine-readable media of claim 1, wherein the first property value estimate is obtained from a base valuation database.

23. The machine-readable media of claim 22, wherein the base valuation database contains a plurality of property valuation predictions derived using an automated property valuation model.

24. A system for adjusting property valuations for bias, comprising:
a processor; and
memory operatively coupled to the processor, the memory containing program code for configuring the processor to
obtain a first estimate of a property value from a first property valuation database, the first estimate exhibiting time lag bias due to a time lag between collection of property value data used by the first property valuation data base and generation of the first estimate by the first property valuation database,
obtain loan application data from an underwriting engine, the loan application data being for loans that have not closed at the time the loan application data was received by the automated underwriting engine, the loan application data including sale prices;
derive an adjustment factor using the sale prices,
apply the adjustment factor to the first property estimate to reduce time lag bias, thereby providing a second property estimate having reduced bias.

25. The system of claim 24, wherein the first estimate exhibits systematic bias selected from at least one of transformation bias, price tier effect and time lag.

26. The system of claim 24, wherein the adjustment factor is derived on a monthly basis.

27. The system of claim 24, wherein the adjustment factor is location-specific.

28. Machine-readable media having program code stored therein, the program code being executable by a processor to perform a method for estimating property values, comprising:
receiving loan application data for a first plurality of properties from an automated underwriting engine, the loan application data being for loans that have not closed at the time the loan application data was received by the automated underwriting engine, the loan application data including a plurality of purchase values; and
generating a plurality of property value estimates for a second plurality of properties based on the plurality of purchase values for the first plurality of properties received from the automated underwriting engine.

* * * * *